(12) United States Patent
Urmston (10) Patent No.: US 7,779,296 B2
(45) Date of Patent: Aug. 17, 2010

(54) STORING DATA REPLICAS REMOTELY

(75) Inventor: Richard Urmston, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/188,220

(22) Filed: Jul. 22, 2005

(65) Prior Publication Data
US 2006/0020762 A1 Jan. 26, 2006

Related U.S. Application Data

(60) Provisional application No. 60/590,595, filed on Jul. 23, 2004.

(51) Int. Cl.
G06F 12/16 (2006.01)
G06F 13/00 (2006.01)

(52) U.S. Cl. .............................. 714/7; 707/204; 711/162

(58) Field of Classification Search .................... 714/7, 714/13, 15, 16, 20, 12; 707/202, 203, 204, 707/640, 644, 648, 649, 653; 711/162
See application file for complete search history.

(56) References Cited

U.S. PATENT DOCUMENTS

| | | | |
|---|---|---|---|
| 6,324,654 B1 | 11/2001 | Wahl et al. | |
| 6,397,307 B2 | 5/2002 | Ohran | |
| 6,564,371 B1 * | 5/2003 | Goldman et al. | 717/127 |
| 6,629,110 B2 * | 9/2003 | Cane et al. | 707/204 |
| 6,802,025 B1 * | 10/2004 | Thomas et al. | 714/15 |
| 6,865,655 B1 * | 3/2005 | Andersen | 711/162 |
| 7,028,153 B1 * | 4/2006 | Noble et al. | 711/162 |
| 7,165,082 B1 * | 1/2007 | DeVos | 707/203 |
| 2002/0112134 A1 * | 8/2002 | Ohran et al. | 711/162 |
| 2003/0167380 A1 * | 9/2003 | Green et al. | 711/136 |
| 2004/0039888 A1 | 2/2004 | LeCrone et al. | |
| 2004/0117572 A1 * | 6/2004 | Welsh et al. | 711/162 |
| 2005/0033755 A1 * | 2/2005 | Gokhale et al. | 707/100 |
| 2006/0041727 A1 * | 2/2006 | Adkins et al. | 711/162 |
| 2006/0059384 A1 * | 3/2006 | Helliker | 714/13 |

OTHER PUBLICATIONS

WordPerfect for IBM Personal Computers and PC Networks (WP), 1990 pp. 39-46.*
U.S. Appl. No. 60/640,971, Kushwah et al.
U.S. Appl. No. 11/084,179, Kushwah et al.
U.S. Appl. No. 11/084,065, Kushwah et al.
U.S. Appl. No. 11/084,679, Kushwah et al.
U.S. Appl. No. 11/084,066, Kushwah et al.
U.S. Appl. No. 11/084,067, Kushwah et al.

\* cited by examiner

*Primary Examiner*—Hong Kim
(74) *Attorney, Agent, or Firm*—Van Pelt, Yi & James LLP (57) ABSTRACT

Storing data is disclosed. All base data is copied from a first storage device to a master set on a second storage device. A request is received to write data to a specified location on the first storage device. An indication is stored in a list that the data at the specified location has changed. At a specified base time and using the stored indication, a replica of the data stored at the specified location as of that time is sent to a remote host associated with the second storage device. The remote host is configured to make and store a copy of the base data stored in the specified location in the master set prior to merging the replica data into the master set.

27 Claims, 12 Drawing Sheets

Replicated Block Data Structure

| Block Number | Replicated Indicator |
|---|---|
| Block #0 | Block Replicated Indicator #0 |
| Block #1 | Block Replicated Indicator #1 |
| Block #2 | Block Replicated Indicator #2 |
| Block #3 | Block Replicated Indicator #3 |
| ⋮ | ⋮ |

STORING DATA REPLICAS REMOTELY

CROSS REFERENCE TO OTHER APPLICATIONS

This application claims priority to U.S. Provisional Patent Application No. 60/590,595 entitled SNAP REPLICATION filed Jul. 23, 2004, which is incorporated herein by reference for all purposes.

BACKGROUND OF THE INVENTION

Data on computers changes, or is updated, over time as new or improved information is available. In some situations, it is desirable to be able to restore or otherwise access information as it existed at a particular point in time. This may be desirable because, for example, the current data has been lost or corrupted or subsequent changes to the data are determined to be undesirable. One solution is to copy all data stored on a source storage device and transfer the copies to another storage device for every time to which a user may want to restore the data to. However, such an approach would consume enormous network, processor, and storage resources; and in many cases the same data would be copied over and over again, even if it had not changed. It would be useful therefore to be able to restore data to particular points in time in a way that uses networking and processing resources efficiently.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, or a computer readable storage medium. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Storing base data replicas remotely is disclosed. A base time or other baseline establishment criteria is selected for which the replication system is able to restore source data to the same state as it existed at the base time or other baseline. Upon receiving a request to write new or modified data to a first storage device at a specified location, a copy of the data from the specified location is stored on one or more other storage devices prior to overwriting the data. The new or modified data is then written to the specified location on the first storage device. In some embodiments, the data stored at the specified storage location is only written to the one or more other storage devices the first time data is written to the specified location after the base time or other baseline. In some embodiments, the replicated data is stored on a storage device that is remote from a source host with which the base data is associated, enabling the base data to be preserved without requiring that it be stored locally.

Figure 1:
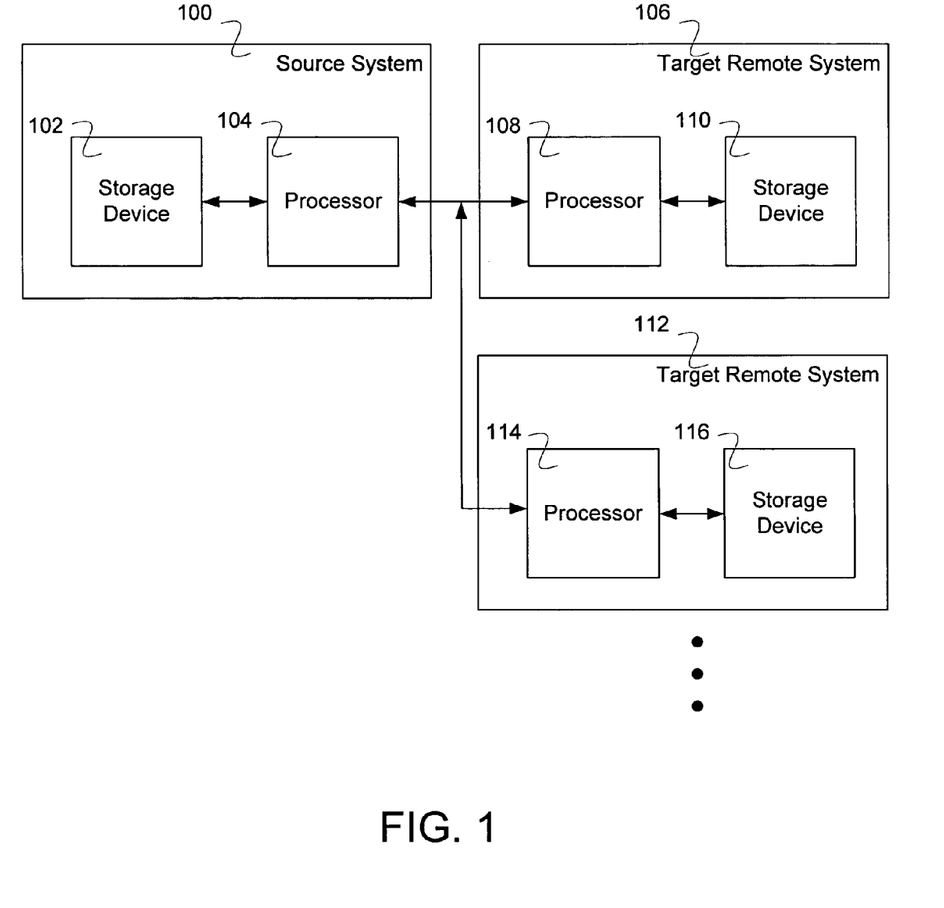
FIG. 1 illustrates an embodiment of a system for storing base data replicas remotely.

FIG. 1 illustrates an embodiment of a system for storing base data replicas remotely. In the example shown, source system 100 includes storage device 102 and processor 104. In some embodiments, source system 100 comprises a host computer system. Data can be transferred between storage device 102 and processor 104. Data can also be transferred between processor 104 and a plurality of target remote systems, in this case represented by target remote systems 106 and 112. In some embodiments, source system 100 includes a communication interface, not shown in FIG. 1, such as a network interface card, coupled to the processor 104, which communication interface is configured to be used to send data from source system to target remote systems such as target remote systems 106 and 112, e.g., via one or more networks. Target remote system 106 includes processor 108 and storage device 110 between which data can be transferred, and target remote system 112 similarly includes processor 114 and storage device 116 between which data can also be transferred. In various embodiments, the target remote storage device is attached to the source system directly as a second storage device within the source system, as an externally attached storage device to the source system, or as a network attached storage device to the source system. In some embodiments, source system 100 is configured to send to one or more target remote systems such as 106 and 112 a replica of base data stored on storage device 102 prior to overwriting such base data with new or updated data. In some embodiments, a replica of base data is sent to a target remote system the first time a specific location on storage device 102 is written to after a base time or other baseline event. The replica data may then be used to retrieve the base data at a later time, e.g., to access from a target remote system a copy of the data as it existed at that time. In some embodiments, the replica data may be sent to the source system and the data as it existed at a time or state with which the replica is associated may be restored and/or otherwise made available at the source system.

In some embodiments, a file system representation of the source data stored on storage device 102, as it existed at a point in time with which the replica data is associated, e.g., a snapshot time, is created on the target remote system and a view of the storage as it existed at that time is made available on the remote system, e.g., as a tree or folder structure a user can navigate to find a prior version of a file. In some embodiments, each time a snapshot is taken on the source system a copy of blocks that have been changed on the source system since the last snapshot, i.e., the new data in those blocks, is sent to the remote system and merged into a master copy of the source blocks on the remote system. In some embodiments, the target remote storage device is configured to accept base data blocks from more than one source system, and prior versions of files or other data from such multiple systems may be accessed from the remote target system.

Figure 2:
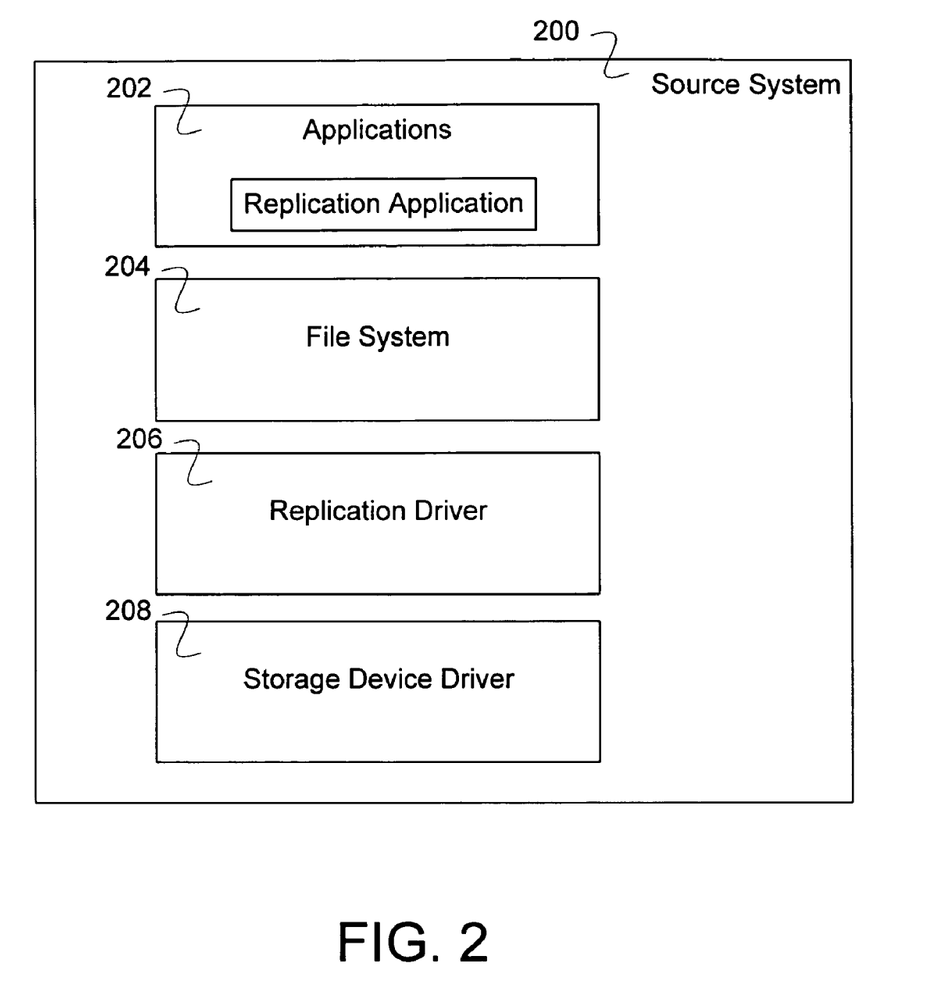
FIG. 2 illustrates an embodiment of a source system for data.

FIG. 2 illustrates an embodiment of a source system for data. In the example shown, source system 200 includes applications 202, file system 204, replication driver 206, and storage device driver 208. Applications 202 include a replication application, e.g., a backup and recovery application that enables a user to store a "snapshot" of an associated storage device or portion thereof that represents the state of data stored on the source storage device (or portion thereof) at a time (or event) associated with the snapshot. In some embodiments, the replication application communicates with replication driver 206, e.g., to inform the replication driver 206 that a base time or other baseline event has occurred or will occur at a specified time. In some embodiments, replication driver 206 is configured to receive requests from applications 202, e.g., via file system 204, to write specified data to a specified location on a storage device associated with storage device driver 208. Replication driver 206 in some embodiments sends to a second storage location, e.g., a second storage device located remotely from source system 200, a replica of base data stored in the specified storage location on the storage device associated with storage device driver 208, e.g., by using storage device driver 208 to read the base data stored in the specified storage location and sending a copy of the read base data to the second storage device, prior to passing to the storage device driver 208 the new or updated data received via the file system 204 from the applicable application 202.

Figure 3:
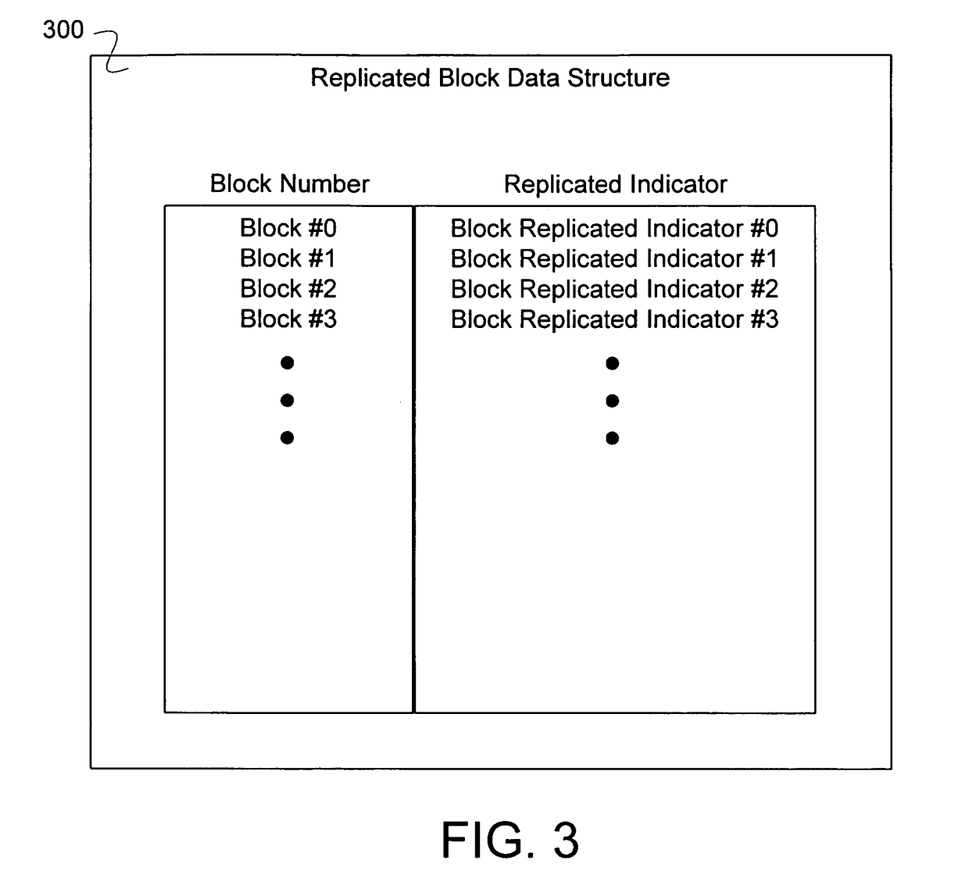
FIG. 3 illustrates a replicated block data structure in one embodiment.

FIG. 3 illustrates a replicated block data structure used in one embodiment to keep track of storage device blocks for which base data has already been copied to a secondary, e.g., remote, storage location. In the example shown, replicated block data structure 300 includes a plurality of block numbers and a plurality of corresponding replicated block indicators. The plurality of block numbers is represented in FIG. 3 by Block #0, Block #1, Block #2, and Block #3. Similarly, the plurality of replicated block indicators is represented in FIG. 3 by Replicated Block Indicator #0, Replicated Block Indicator #1, Replicated Block Indicator #2, and Replicated Block Indicator #3. In some embodiments, the replicated block data structure includes a bit map where each bit in the bit map corresponds to a block on the source storage device and the bit state of '0' or '1' indicates whether a replica of base data associated with the data block has been or has not been stored remotely. In some embodiments, the replicated block data structure on the source system, e.g., a bitmap, is reset each time a snapshot is taken. In some embodiments, a remote target system maintains a pool of base data block replicas for each snapshot taken at the source system. A new pool is created when a new snapshot is taken on the source system.

In some embodiments, over time (e.g., after a preconfigured and/or configurable period of time and/or the occurrence of a preconfigured and/or configurable event and/or number, group, and/or series or sequence of events) pools associated with prior snapshots are retired on the remote system, e.g. by merging them into a master set of source system data blocks stored on the remote system and/or by deleting blocks of stored base data that are obsolete or no longer of interest, after which data cannot be accessed in a form as it existed at a time or state associated with such snapshots for which the replica data block pool on the remote system has been retired.

Figure 4:
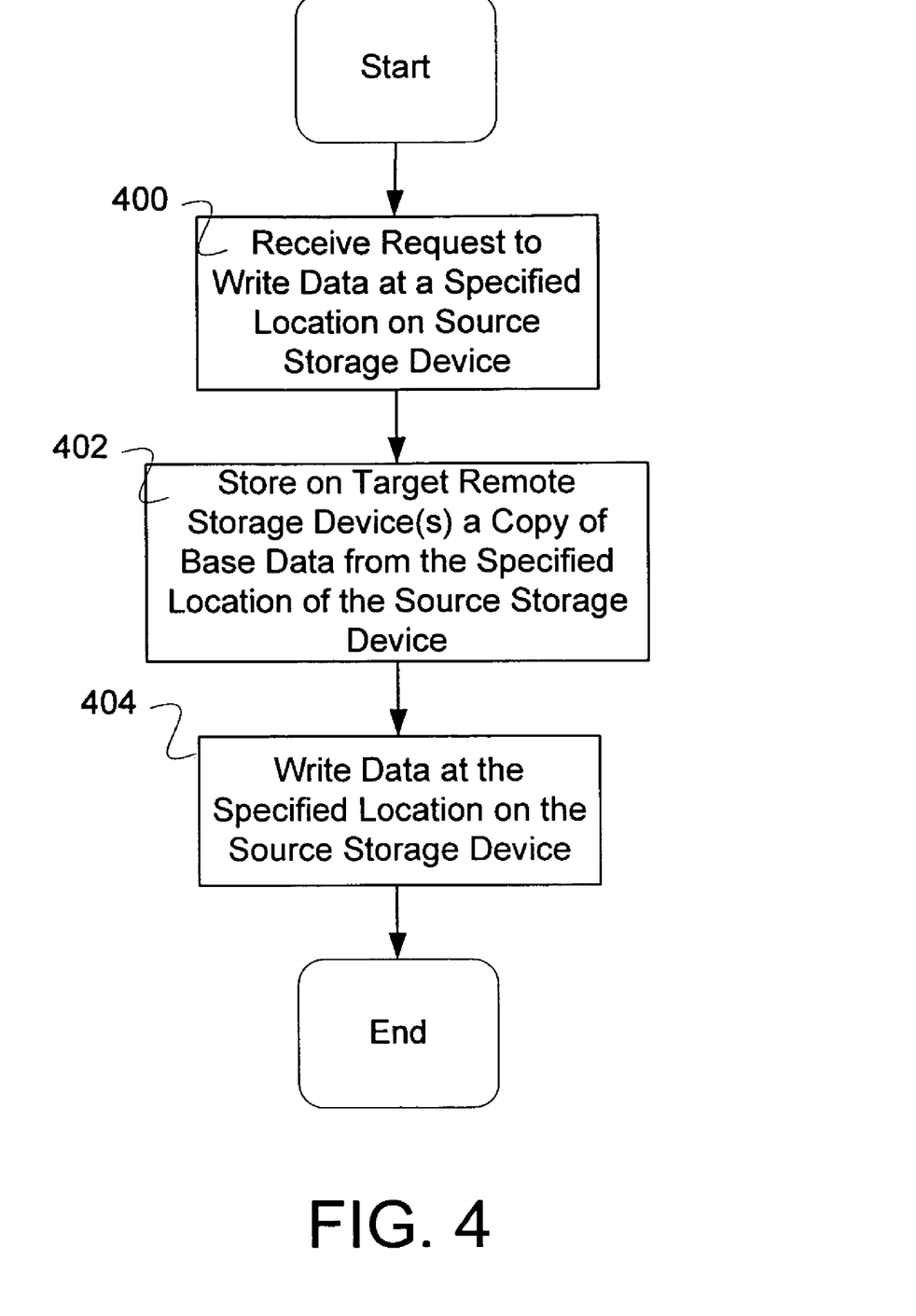
FIG. 4 illustrates an embodiment of a process for storing base data replicas remotely.

FIG. 4 illustrates an embodiment of a process for storing base data replicas remotely. In the example shown, in 400 a request is received to write data at a specified location on a source storage device. In some embodiments, writing data at a specified location on a source storage device includes writing one or more data blocks on the source storage device, with the result that base data (if any) stored in the one or more data blocks would be over written. In 402, a copy of base data from the specified location on the source storage device is stored on one or more target remote storage device(s). In some embodiments, the one or more base data blocks are stored on one or more target remote devices to allow the replication application to be able to restore the base data at a later time. In 404, data is written to the specified location on the source storage device. Because of this, the one or more base data blocks are overwritten with the requested data at the specified location on the source storage device.

Figure 5:
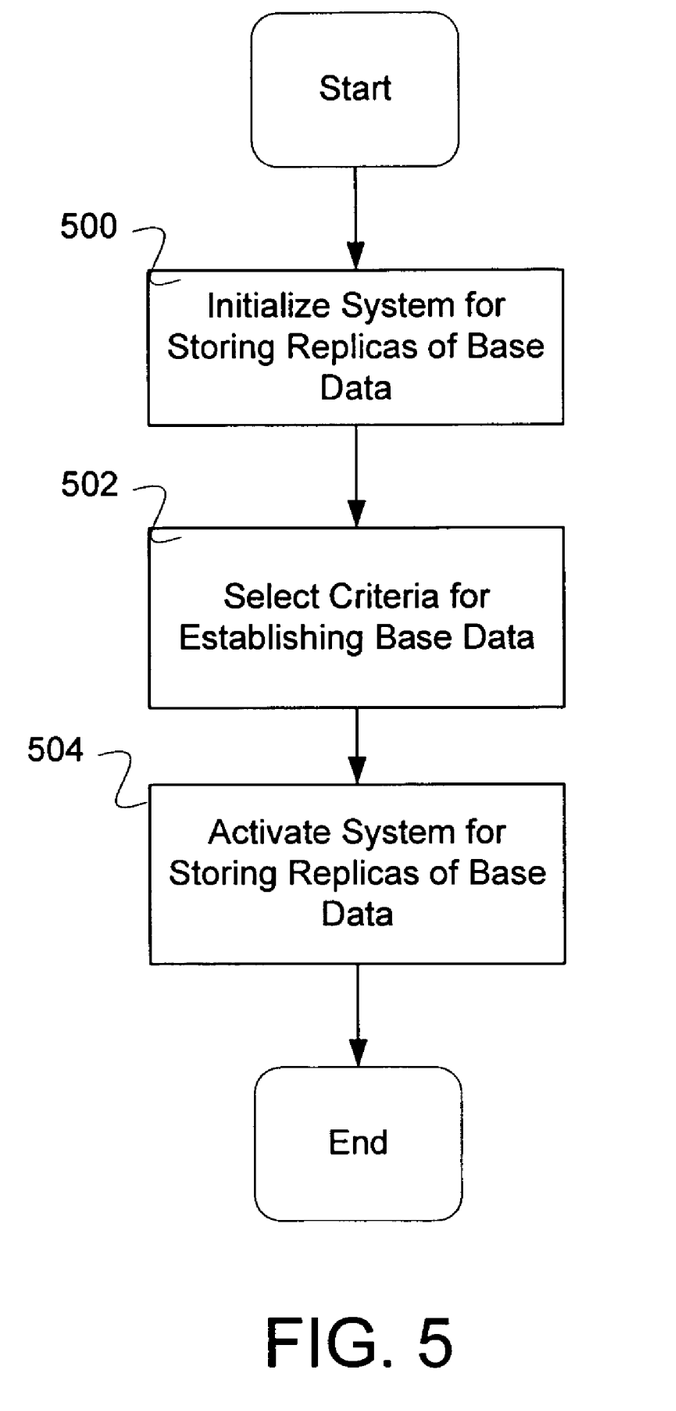
FIG. 5 illustrates an embodiment of a process for a replication system.

FIG. 5 illustrates an embodiment of a process for configuring a replication system. In some embodiments, the system comprises a replication application and a replication driver. In the example shown, in 500 the system is initialized for storing replicas of base data. Initialization in some embodiments includes selecting the source data blocks for which base data is to be replicated, selecting the one or more target remote systems on which to store the replicas of the base data, and initializing the replication driver. In 502, criteria are selected for the base data. Base data can be defined to occur at a base time where the base time is specified on a periodic basis (for example, once a week), at a defined time, when an event occurs (for example, a software version release, or after a predetermined amount of data has changed), or any other manner for which it is determined that a remotely stored copy of the base data is desired. In some embodiments, the event is a snapshot backup where a snapshot backup enables data to be restored to the same state as the data existed at the time of the snapshot. In some embodiments, a user of the source system may indicate at any arbitrary time that a snapshot or other baseline event should occur. In 504, the system for storing base data replicas is activated.

In some embodiments, initialization includes copying the source data blocks to the target remote systems to create a master set of data blocks.

Figure 6:
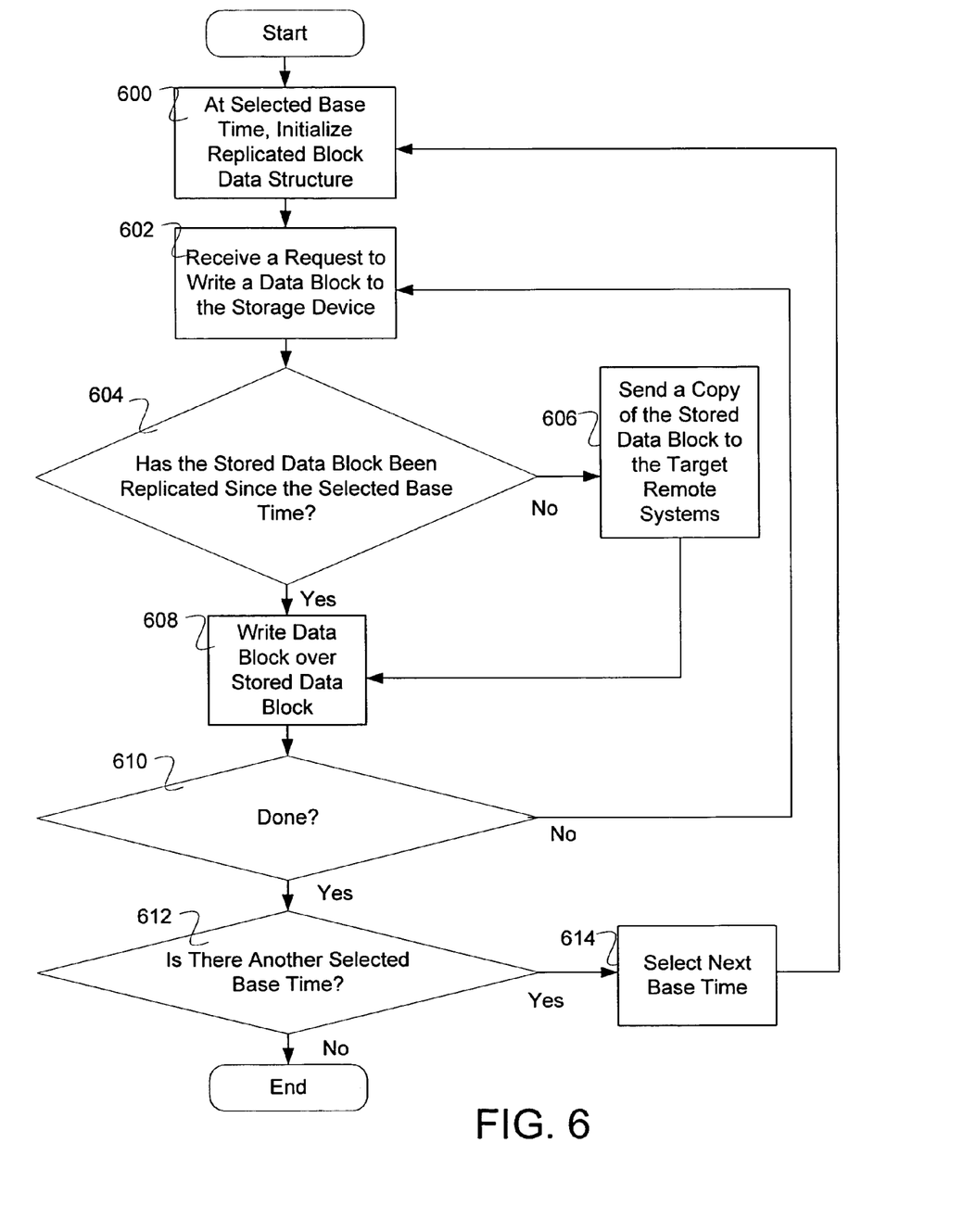
FIG. 6 illustrates an embodiment of a process for activating the system for storing base data replicas.

FIG. 6 illustrates an embodiment of a process for storing base data replicas remotely. In 600, at a selected base time, a replicated block data structure is initialized. In some embodiments, the replicated block data structure comprises the replicated block data structure 300 of FIG. 3 and/or a bit map, and 600 includes resetting block status bits or other values, such as the "block replicated indicator" values in FIG. 3, to a value or state that indicates the base data associated with the block has not yet been replicated. In 602, a request to write a data block at a specific location on the storage device containing the source data blocks for the base data is received. Once a request has been received, it is determined if a replica of base data associated with the specific location on the storage device has been stored on a target remote system in 604. If a replica of the base data has not already been stored, then in 606 a copy of the data currently stored in the specific location is sent to one or more target remote systems and the replicated block data structure is changed to indicate that a copy has been stored remotely. Control passes to 608. If a replica has been stored, or once a replica is stored in 606, in 608 the received data is written to the specific location as requested. In 610, it is determined if the current iteration of the process of FIG. 6 is done. In some embodiments, it is determined in 610 that the current iteration is done if all of the source data blocks have been replicated (i.e. a replica of the data block has been stored on one or more target remote systems) since the selected base time. In some embodiments, it is determined in 610 that the current iteration is done if a next base time arrives or some other baseline event occurs. If it is determined at 610 that the current iteration is not done, then control passes to 602 and processes continues when a next request to write data to a specific location is received, if any. If it is determined in 610 that the current iteration is done, then in 612 it is determined if there is another base time. If there is another base time, then in 614 the next base time is selected and control passes to 600. If there is not another base time, then the process ends.

Figure 7:
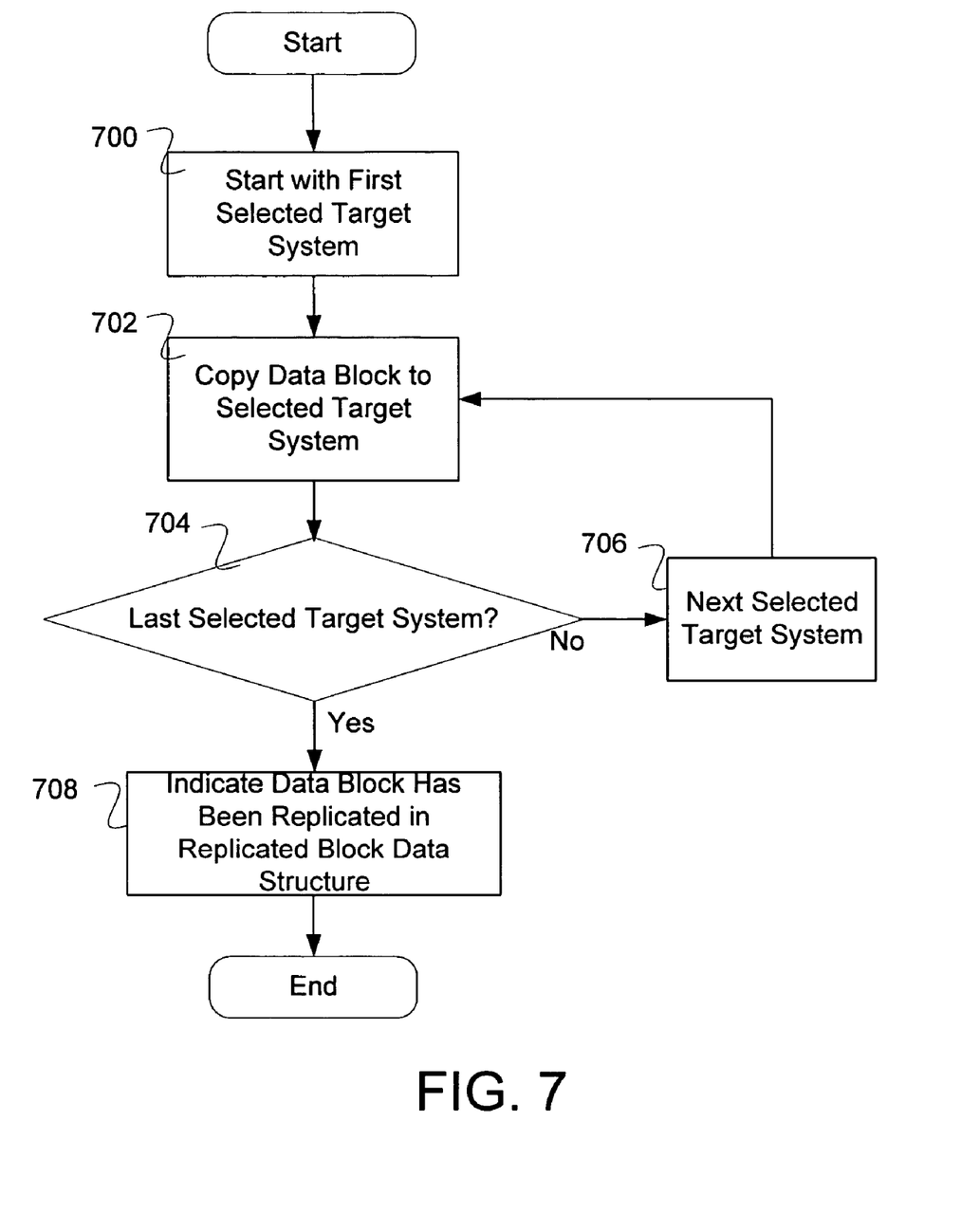
FIG. 7 illustrates an embodiment of a process for copying a data block to one or more remote target systems.

FIG. 7 illustrates an embodiment of a process for copying a data block to one or more remote target systems. In some embodiments, the process in FIG. 7 is used to implement 606 of FIG. 6. In the example shown, in 700 the process starts with a first selected target remote system. In 702, the data block is copied to the selected target remote system. In 704, it is determined if it is the last target remote system. If it is not the last target remote system, then in 706 the next target remote system is selected and control passes to 702. If it is the last target remote system, then in 708 it is indicated in that the data block has been replicated in the replicated block data structure and the process ends. In various embodiments, data blocks are broadcast in parallel to the target remote systems or data blocks can be sent to one target remote system which then passes the data blocks onto another target remote system (and so on, until all target remote systems have received the data blocks).

Figure 8:
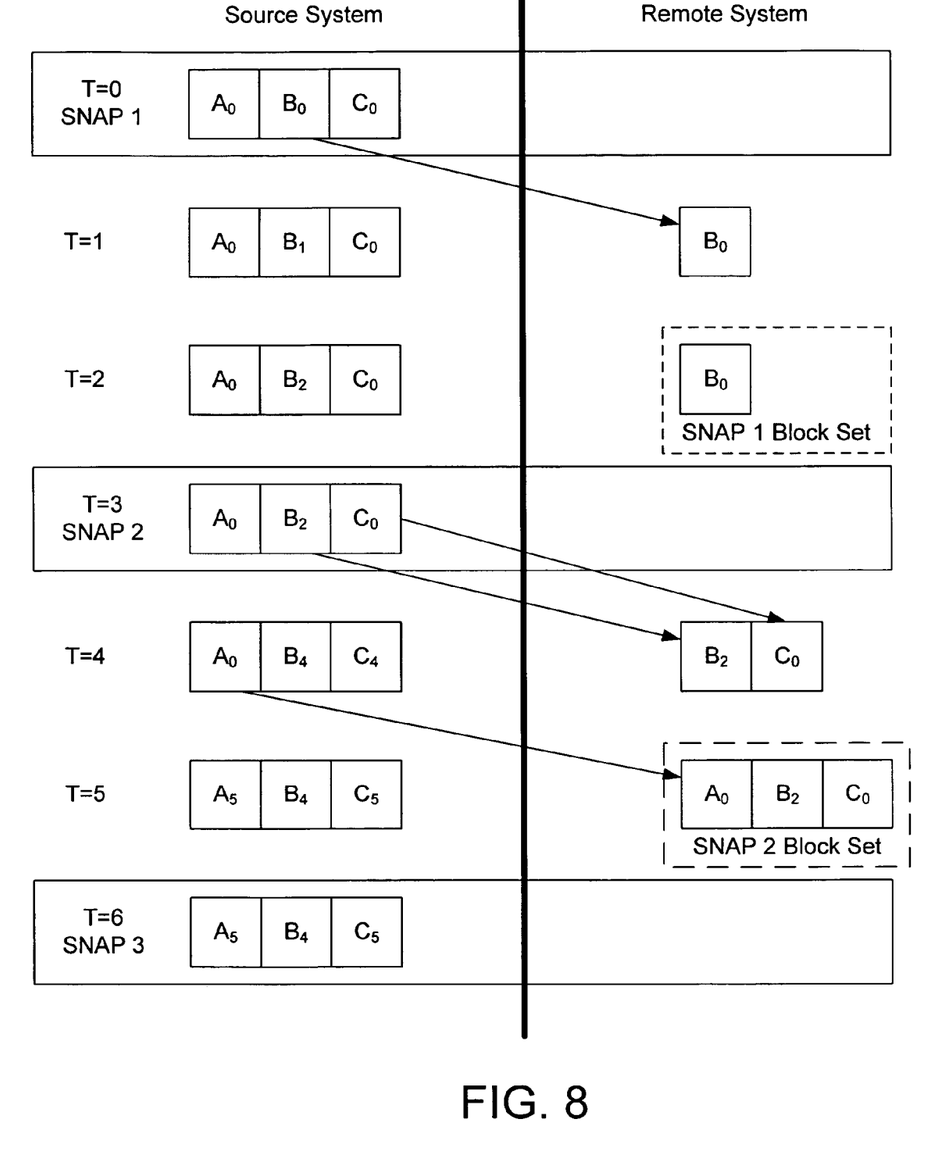
FIG. 8 illustrates an example of a time sequence for replica data blocks.

FIG. 8 illustrates an example of a time sequence of source system and remote system stored blocks in one embodiment. In the example shown, at time t=0, snapshot 1 occurs, and the source system has stored blocks $A_0$, $B_0$, and $C_0$ and the remote system has no stored blocks. At time t=1, block $B_0$ changes to $B_1$ which causes a copy of $B_0$ (base data block) to be sent to the remote system. At time t=2, block $B_1$ changes to $B_2$ which does not cause any copies to be sent over since $B_0$ (base data block) has already been sent. At time t=3, snapshot 2 occurs, and by gathering all the blocks sent over since the last snapshot, snap 1 block set is created on the remote system with $B_0$. At time t=4, block $B_2$ and $C_0$ change to $B_4$ and $C_4$ which causes a copy of $B_2$ and $C_0$ (base data blocks) to be sent to the remote system. At time t=5, block $A_0$ and $C_4$ change to $A_5$ and $C_5$ which causes a copy $A_0$ (base data block) to be sent over. Note $C_4$ is not sent over since $C_0$ was already been sent since the last snapshot. At time t=6, snapshot 3 occurs, and by gathering all the blocks sent over since the last snapshot, snap 2 block set is created on the remote system with $A_0$, $B_2$, and $C_0$. In this way, a block set of base blocks is created that enables all or part of the source data set as it existed at a time associated with the snapshot with which the block set is associated to be accessed by merging the applicable blocks comprising the block set with the corresponding portions of the source data set, which may be done on the source system and/or the remote system, depending on the embodiment.

Figure 9:
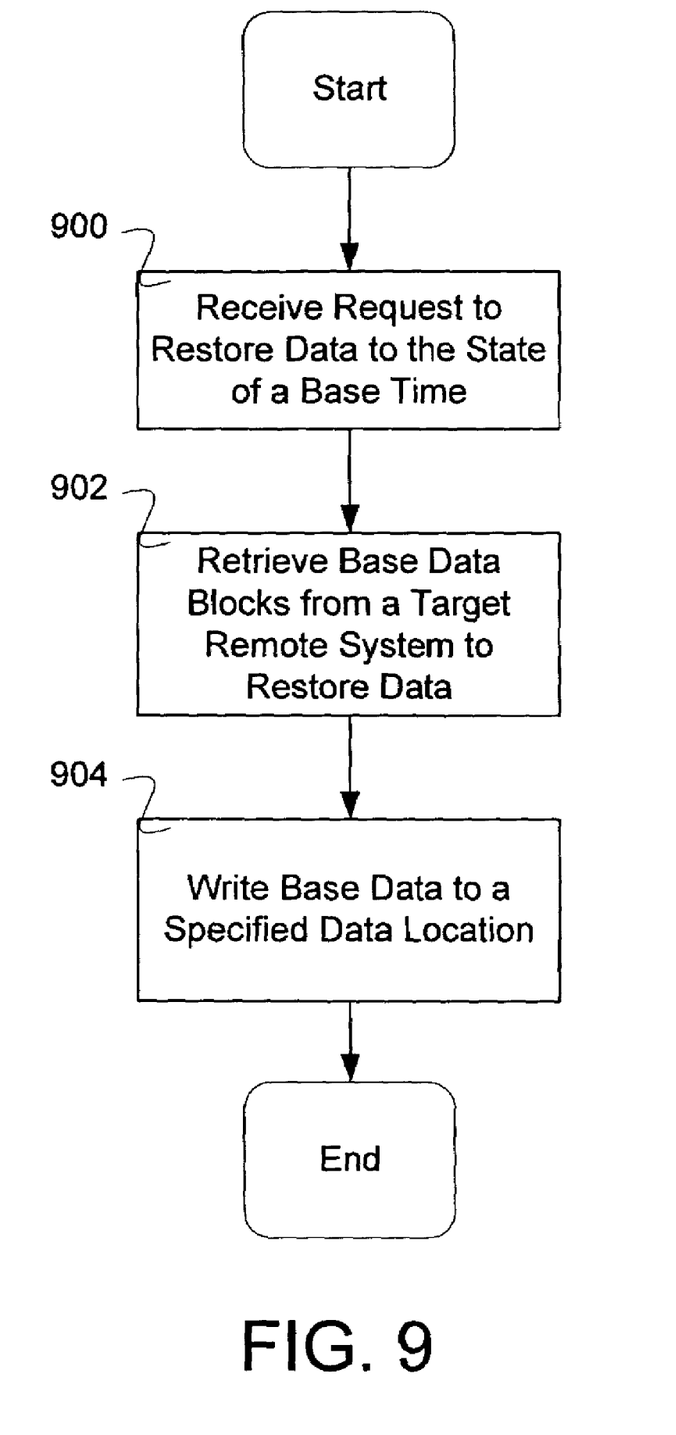
FIG. 9 illustrates an embodiment of a process for restoring data.

FIG. 9 illustrates an embodiment of a process for restoring data. In the example shown, in 900 a request is received to restore data to the state the data was in at a specific base time. In 902, the base data blocks corresponding to the requested data are retrieved from a target remote system in order to restore the data. In some embodiments, stored blocks from the source system are required to restore data to the state the data was in at a specified base time. In 904, the base data blocks are written to a specified location on a storage device and the process ends. In some embodiments, the process of FIG. 9 may be used to retrieve a version of data, such as a document or other file, as it existed at a base time or at a time associated with a baseline event. In some embodiments, a file system representation of the storage at a point in time is created on the source system and a view of the storage as it existed at the specified point in time is presented to a user.

Figure 10:
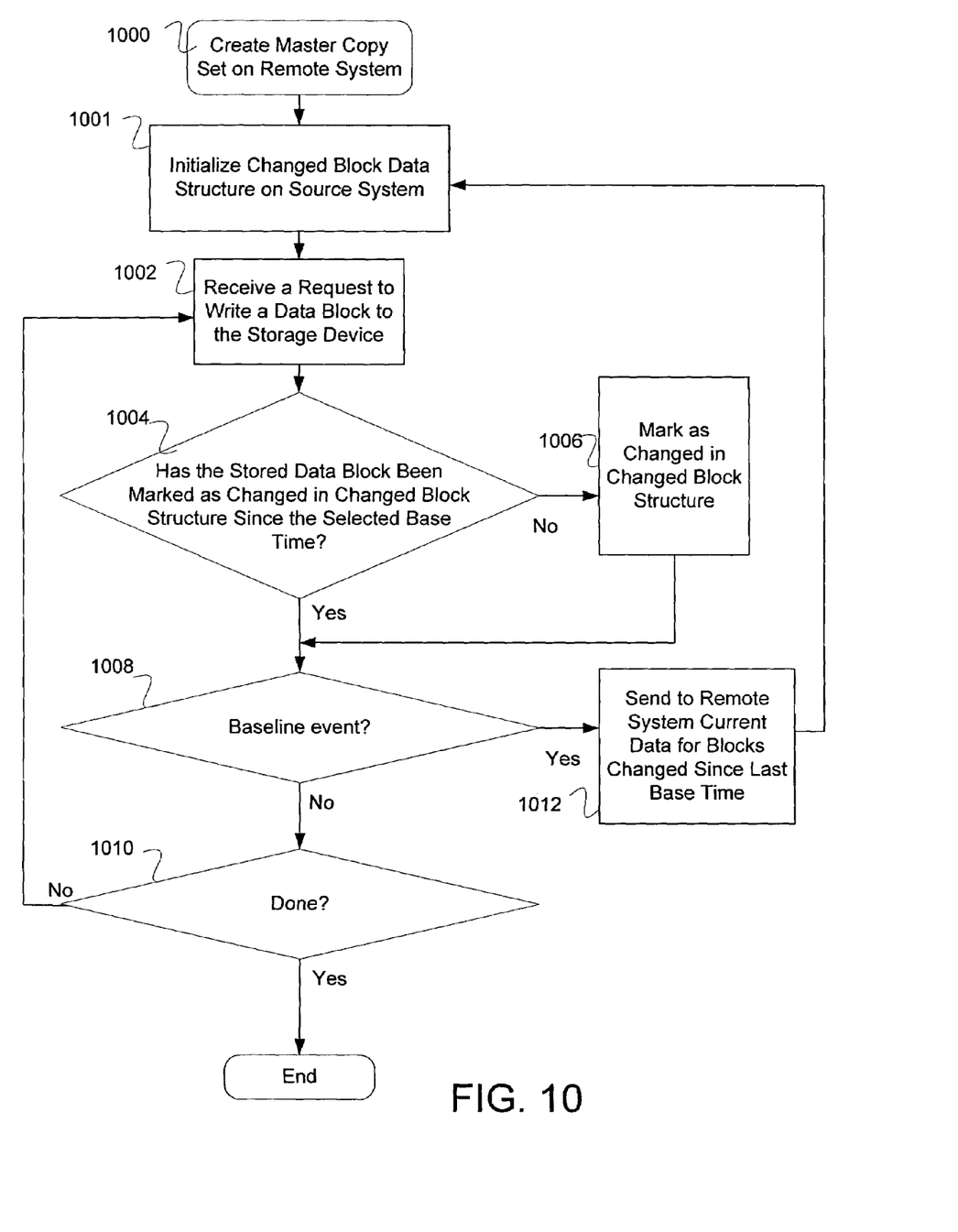
FIG. 10 illustrates an embodiment of a process for storing data replicas remotely.

FIG. 10 illustrates an embodiment of a process for storing data replicas remotely. In 1000, a master set of base data blocks is copied from the source system to the remote system. In 1001, a changed block data structure used to track which blocks on the source system have been changed since a last base time is initialized. In some embodiments, the changed block data structure comprises the replicated block data structure 300 of FIG. 3 and/or a bit map, and 1001 includes resetting block status bits or other values, such as the "block replicated indicator" values in FIG. 3, to a value or state that indicates the base data associated with the block has changed and needs to be replicated. In 1002, a request to write a data block at a specific location on the storage device containing the source data blocks for the base data is received. Once a request has been received, it is determined if the stored data block has already been marked as changed in the changed block data structure in 1004. If the stored data block has not already been marked as changed in the changed block data structure, then in 1006 the stored block is marked as changed (and needs to be replicated) in the changed block data structure. If the changed block is already listed in the changed block data structure as having been changed (1004), or once the changed block data structure is changed to indicate that a block needs to be replicated in 1006, in 1008 it is determined if the next base event has occurred, e.g., has a snapshot been requested? If it is determined at 1008 that the base event has not occurred, in 1010 it is determined whether the process of FIG. 10 is done. In some embodiments, the process may be terminated by a user, at a prescribed time, or otherwise. If the process is not done, then control passes to 1002 and processing continues when a next request to write data to a specific location is received, if any. If it is determined in 1008 that a base event has occurred and/or been requested, e.g., a request to store a snapshot is received, then in 1012 a copy of the current data stored on the source system in any blocks that have been changed since the last base event is sent to the remote system, and control passes to 1001 in which the changed block data structure is reset. In various embodiments, the data currently stored in changed blocks is sent to the remote system as changes are made, in small batches, at regular intervals, and/or at the time a base event, such as a snapshot, occurs. In some embodiments, the remote system stores a copy of the base data in each changed block prior to merging the changed data into the master set. In some embodiments, the source system stores a copy of the base data prior to storing changed data in a block. In some embodiments, the source system may be configured to send a copy of the base data to the remote system.

Figure 11:
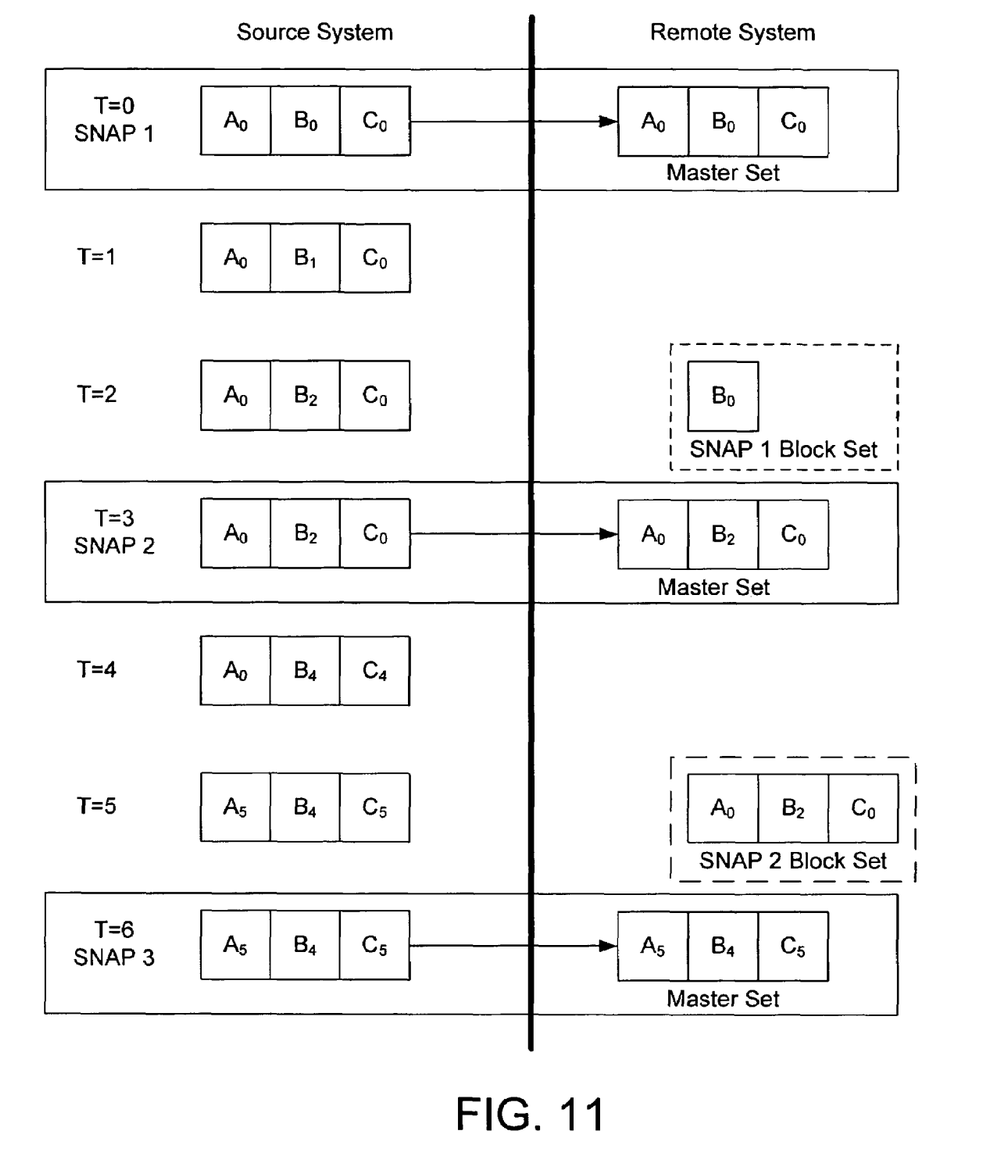
FIG. 11 illustrates an example of a time sequence for replica data blocks.

FIG. 11 illustrates an example of a time sequence of source system and remote system stored blocks in one embodiment. In the example shown, at time t=0, snapshot 1 occurs, and the source system has stored blocks $A_0$, $B_0$, and $C_0$ and the remote system is sent a copy so that it has stored blocks $A_0$, $B_0$, and $C_0$. At time t=1, block $B_0$ changes to $B_1$ which causes a changed block data structure to indicate that block B has been changed and that it will need to be replicated at the time of the next snapshot. In some embodiments, changed blocks (i.e., the as stored in those blocks at the time) are sent in a batch to the remote system when a snapshot is taken. At time t=2, block $B_1$ changes to $B_2$ which does not prompt any further action since the changed block data structure has already indicated that this block has changed. At time t=3, snapshot 2 occurs. The source system sends to the remote system a copy of the current (i.e., changed) data stored in any blocks that have been changed since the last snapshot, e.g., as determined by checking the changed block data structure. On the remote system, snap 1 block set is created by replicating $B_0$ before the changed blocks are merged into the master copy set on the remote system. At time t=4, block $B_2$ and $C_0$ change to $B_4$ and $C_4$ which causes the changed block data structure to indicate that blocks B and C changed and that these data blocks will need to be replicated before (or at) the next snapshot to enable the remote system to create the next block set. At time t=5, block $A_0$ and $C_4$ change to $A_5$ and $C_5$ which the changed block data structure to indicate that $A_0$ (base data block) is changed and that this data block will need to be replicated before the next snapshot to enable the remote system to create the next block set. Note the changed block data structure is not changed due to the change to $C_4$ because a change to C was already indicated. At time t=6, snapshot 3 occurs, the source system sends to the remote system the data currently stored in the blocks that have been changed since the last snapshot, and snap 2 block set is created on the remote system, with $A_0$, $B_2$, and $C_0$, by copying $A_0$, $B_2$, and $C_0$ before the changed blocks are merged into the master copy set on the remote system.

Figure 12:
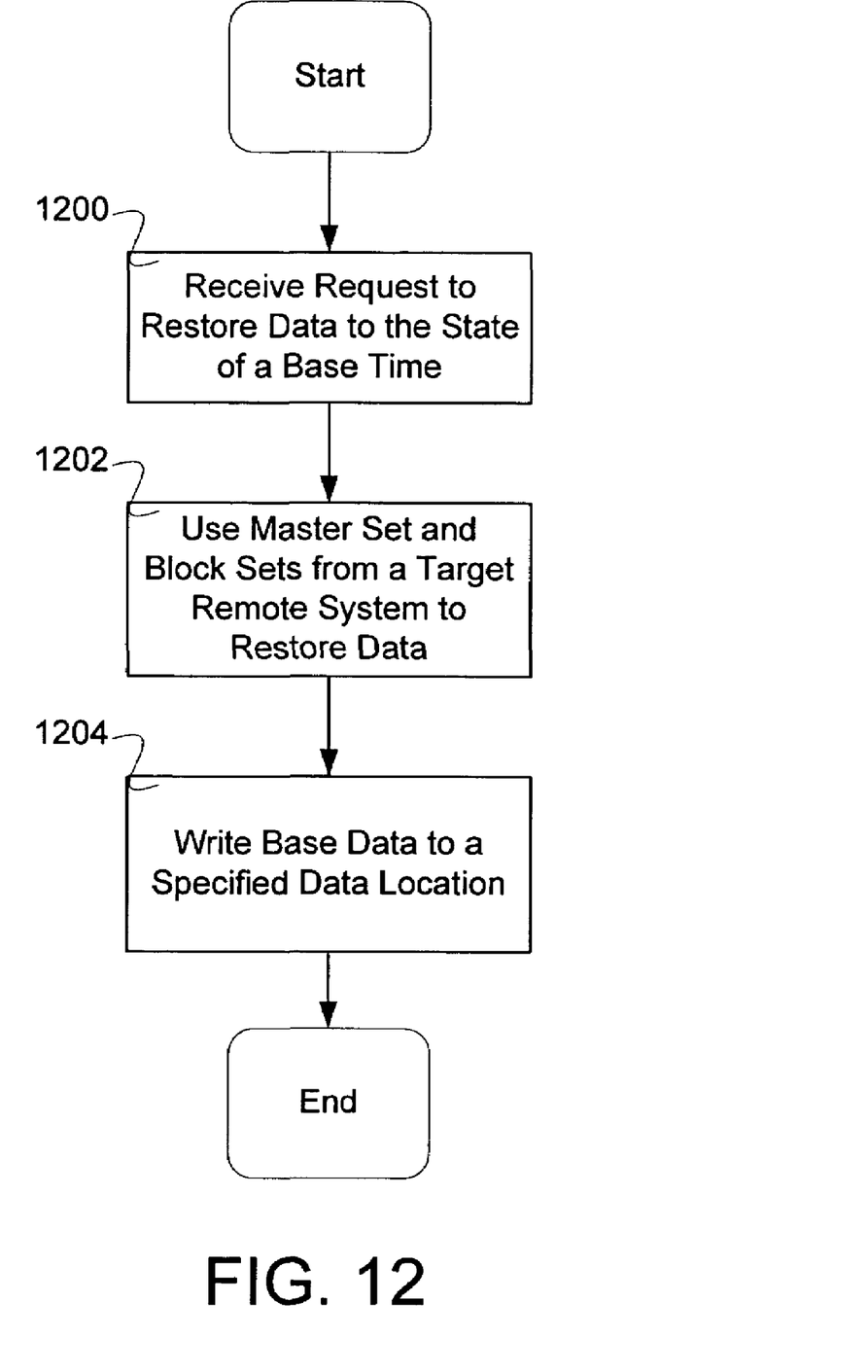
FIG. 12 illustrates an embodiment of a process for restoring data.

FIG. 12 illustrates an embodiment of a process for restoring data. In the example shown, in 1200 a request is received to restore data to the state the data was in at a specific base time. In 1202, the master copy set and intervening block sets of base data blocks on the remote system are used to restore the data, e.g., by merging the applicable base data blocks, if any, with the applicable blocks from the master copy set to generate a set of blocks associated with the requested data, e.g., a file, as it existed at a prior point in time, e.g., at the time of a prior snapshot. In 1204, the base data blocks are written to a specified location on a storage device and the process ends. In some embodiments, the process of FIG. 12 may be used to retrieve a version of data, such as a document or other file, as it existed at a base time or at a time associated with a baseline event. In some embodiments, a file system representation of the storage at a point in time is created on the target remote system and a view of the storage as it existed at the specified point in time is presented to a user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of storing data comprising:
copying base data from a first storage device of a source system to a master set on a second storage device of a remote host;
receiving one or more requests to write data to one or more specified blocks on the first storage device;
storing in a list one or more indications that the data at the one or more specified blocks has changed, wherein a further change to one specified block of the one or more specified blocks since a prior specified base time does not prompt a change to the one indication of the one or more indications corresponding to the one specified block of the one or more specified blocks; and
at a specified base time and using the stored one or more indications, sending to a remote host associated with the second storage device a replica of the data stored at the one or more specified blocks as of that time;
wherein the remote host is configured to make and store a copy of the base data stored in the one or more specified blocks in the master set on the second storage device prior to merging the replica of the data into the master set.

2. A method as in claim 1, wherein the one or more specified blocks are sent to the remote host in a batch.

3. A method as in claim 1, wherein the one or more indications are stored in a changed block structure.

4. A method as in claim 3, wherein the changed block structure indicates a change since a prior base time.

5. A method as in claim 1, wherein the one or more requests to write data are received at one or more times.

6. A method as in claim 1, wherein the specified base time is one of a plurality of base times.

7. A method as in claim 1, wherein the specified base time comprises a time not associated with a change to one or more specified blocks.

8. A method as in claim 1, further comprising creating on the second storage device a file system representation of any data copied from the first storage device to the second storage device the master set; and
making available on the second storage device a view of any data copied from the first storage device to the second storage device that will enable a user to navigate to find a prior version of the data copied from the first storage device to the second storage device.

9. A method as in claim 1, wherein the one or more indications comprises one or more bitmaps.

10. A system for storing data comprising:
a processor; and
a memory coupled with the processor, wherein the memory is configured to provide the processor with instructions which when executed cause the processor to:
copy base data from a first storage device of a source system to a master set on a second storage device of a remote host;
receive one or more requests to write data to one or more specified blocks on the first storage device;
store in a list one or more indications that the data at the one or more specified blocks has changed, wherein a further change to one specified block of the one or more specified blocks since a prior specified base time does not prompt a change to the one indication of the one or more indications corresponding to the one specified block of the one or more specified blocks; and
at a specified base time and using the stored one or more indications, send to a remote host associated with the second storage device a replica of the data stored at the one or more specified blocks as of that time;
wherein the remote host is configured to make and store a copy of the base data stored in the one or more specified blocks in the master set on the second storage device prior to merging the replica of the data into the master set.

11. A system as in claim 10, wherein the one or more specified blocks are sent to the remote host in a batch.

12. A system as in claim 10, wherein the one or more indications are stored in a changed block structure.

13. A system as in claim 12, wherein the changed block structure indicates a change since a prior base time.

14. A system as in claim 10, wherein the one or more requests to write data are received at one or more times.

15. A system as in claim 10, wherein the specified base time is one of a plurality of base times.

16. A system as in claim 10, wherein the specified base time comprises a time not associated with a change to one or more specified blocks.

17. A system as in claim 10, wherein the memory is further configured to provide the processor with instructions which when executed cause the processor to
create on the second storage device a file system representation of any data copied from the first storage device to the second storage device the master set; and
make available on the second storage device a view of any data copied from the first storage device to the second storage device that will enable a user to navigate to find a prior version of the data copied from the first storage device to the second storage device.

18. A system as in claim 10, wherein the one or more indications comprises one or more bitmaps.

19. A computer program product for storing data, the computer program product being embodied in a computer readable storage medium and comprising computer instructions for:
copying base data from a first storage device of a source system to a master set on a second storage device of a remote host;
receiving one or more requests to write data to one or more specified blocks on the first storage device;
storing in a list one or more indications that the data at the one or more specified blocks has changed, wherein a further change to one specified block of the one or more specified blocks since a prior specified base time does not prompt a change to the one indication of the one or more indications corresponding to the one specified block of the one or more specified blocks; and
at a specified base time and using the stored one or more indications, sending to a remote host associated with the second storage device a replica of the data stored at the one or more specified blocks as of that time;
wherein the remote host is configured to make and store a copy of the base data stored in the one or more specified blocks in the master set on the second storage device prior to merging the replica of the data into the master set.

20. A computer program product as in claim 19, wherein the one or more specified blocks are sent to the remote host in a batch.

21. A computer program product as in claim 19, wherein the one or more indications are stored in a changed block structure.

22. A computer program product as in claim 21, wherein the changed block structure indicates a change since a prior base time.

23. A computer program product as in claim 19, wherein the one or more requests to write data are received at one or more times.

24. A computer program product as in claim 19, wherein the specified base time is one of a plurality of base times.

25. A computer program product as in claim 19, wherein the specified base time comprises a time not associated with a change to one or more specified blocks.

26. A computer program product as in claim 19, comprising further computer instructions for: creating on the second storage device a file system representation of any data copied from the first storage device to the second storage device the master set; and
making available on the second storage device a view of any data copied from the first storage device to the second storage device that will enable a user to navigate to find a prior version of the data copied from the first storage device to the second storage device.

27. A computer program product as in claim 19, wherein the one or more indications comprises one or more bitmaps.

* * * * *